United States Patent
Wolf et al.

(10) Patent No.: US 8,462,592 B1
(45) Date of Patent: Jun. 11, 2013

(54) ENERGY-ASSISTED MAGNETIC RECORDING HEAD HAVING WAVEGUIDE CAPABLE OF PROVIDING SMALL BEAM SPOTS

(75) Inventors: Christopher B. Wolf, San Jose, CA (US); Eric J. Champion, San Jose, CA (US); Kroum S. Stoev, Pleasanton, CA (US); Matthew R. Gibbons, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 267 days.

(21) Appl. No.: 12/948,425

(22) Filed: Nov. 17, 2010

(51) Int. Cl.
*G11B 11/00* (2006.01)

(52) U.S. Cl.
USPC .................................. 369/13.33; 369/13.13

(58) Field of Classification Search
USPC .......... 369/13.13, 13.33, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | | |
|---|---|---|---|
| 6,834,027 B1 | 12/2004 | Sakaguchi et al. | |
| 6,930,975 B2 | 8/2005 | Tawa et al. | |
| 7,171,080 B2 | 1/2007 | Rausch | |
| 7,272,079 B2 | 9/2007 | Challener | |
| 7,440,660 B1 | 10/2008 | Jin et al. | |
| 7,492,804 B2 | 2/2009 | Tawa | |
| 7,567,387 B2 | 7/2009 | Itagi et al. | |
| 7,596,072 B2 | 9/2009 | Buechel et al. | |
| 7,596,295 B2 | 9/2009 | Hasegawa | |
| 2005/0157393 A1 | 7/2005 | Hasegawa et al. | |
| 2005/0157595 A1 | 7/2005 | Tawa et al. | |
| 2008/0002529 A1* | 1/2008 | Sekine et al. | 369/13.33 |
| 2008/0049563 A1* | 2/2008 | Konno et al. | 369/13.33 |
| 2008/0198496 A1 | 8/2008 | Shimazawa et al. | |
| 2010/0020431 A1* | 1/2010 | Shimazawa et al. | 369/13.33 |
| 2011/0205866 A1* | 8/2011 | Osawa et al. | 369/13.33 |
| 2012/0082016 A1* | 4/2012 | Komura et al. | 369/13.33 |

OTHER PUBLICATIONS

Y.P. Rakovich, et al., "Photonic Nanojets in Coupled Microcavities", European Conference on Lasers and Electro-Optics 2009 and the European Quantum Electronics Conference (CLEO Europe—EQUEC 2009), Munich, Jun. 14-19, IEEE, 2009, pp. 5191625.

* cited by examiner

*Primary Examiner* — Tan X Dinh

(57) ABSTRACT

A method and system for providing an EAMR transducer is described. The EAMR transducer has an ABS and is coupled with a laser. The EAMR transducer includes a write pole, coil(s), and an energy delivery device. The write pole magnetically writes to the media. The coil(s) energize the write pole. The energy delivery device is optically coupled with the laser and includes a top distal from the ABS, a bottom proximate to the ABS, a first side, and a second side opposite to the first side. The first side has a first apex angle from a normal to the ABS and is reflective. The second side has a second apex angle from the normal and is reflective. The first and second apex angles are each at least three and not more than twenty-five degrees. The first and second sides converge such that the top is wider than the bottom.

31 Claims, 5 Drawing Sheets

ENERGY-ASSISTED MAGNETIC RECORDING HEAD HAVING WAVEGUIDE CAPABLE OF PROVIDING SMALL BEAM SPOTS

BACKGROUND

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes grating 32, a conventional waveguide 12 including a core 13 and cladding 11, conventional pole 30, and near-field transducer (NFT) 40. The conventional EAMR transducer 10 is shown with a laser spot 14 that is guided by the conventional waveguide 12 to the NFT 40 near the air-bearing surface (ABS). The NFT 40 focuses the light to magnetic recording media (not shown), such as a disk. Other components that may be part of the conventional EAMR transducer 10 are not shown.

In operation, light from the spot 14 is coupled to the conventional EAMR transducer 10 using the grating 32. The waveguide 12, which is shown as including a planar solid immersion mirror, cladding 11, and core 13, directs light from the grating 32 to the NFT 40. In other conventional EAMR transducers, the conventional waveguide 12 could take other forms. The direction of travel of the light as directed by the conventional waveguide 12 can be seen by the arrows 18 and 20. The NFT 40 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. The trend in magnetic recording continues to higher recording densities. As a result, the track width is desired to be made smaller. The track width is defined by the pin width of the NFT 40. The smaller the width of the pin of the NFT 40, the higher the areal density. However, the efficiency and reliability of fabricating such NFTs may be limited. For example, to obtain an areal density of 2 $Tb/in^2$, a thermal spot size of approximately thirty nanometers at full width half max may be used. Based on this, the pin of the NFT 40 for such a spot would be approximately thirty nanometers in width. In addition, there is currently approximately a twenty nanometer offset between the optical spot and thermal spot due to the thermal conduction of the media (not shown). The NFT 40 thus has a smaller width than the desired spot size. In the example above, an NFT 40 having a width of approximately ten nanometers is desired. This may be an extremely challenging requirement for fabrication. Further, such an NFT 40 may be more susceptible to failure due to overheating. In other contexts, such in photonic nanojets, a hemisphere may be used to provide a smaller spot. However, it is impractical to place a micron-scale dielectric sphere within the head structure and slider during fabrication. Accordingly, a mechanism for providing a small spot is still desired.

BRIEF SUMMARY OF THE INVENTION

A method and system for providing an energy assisted magnetic recording (EAMR) transducer is described. The EAMR transducer is coupled with a laser for providing energy and has an air-bearing surface (ABS) configured to reside in proximity to a media during use. The EAMR transducer includes a write pole, at least one coil, and an energy delivery device. The write pole is configured to write to a region of the media. The coil(s) are for energizing the write pole. The energy delivery device is optically coupled with the laser and includes a top distal from the ABS, a bottom proximate to the ABS, a first side, and a second side opposite to the first side. The first side has a first apex angle from a normal to the ABS and is reflective. The second side has a second apex angle from the normal to the ABS and is also reflective. The first apex angle is at least three and not more than twenty-five degrees. The second apex angle is also at least three and not more than twenty-five degrees. The first side and the second side converge such that the top is wider than the bottom.

DETAILED DESCRIPTION OF THE EMBODIMENTS OF THE INVENTION

Figure 1:
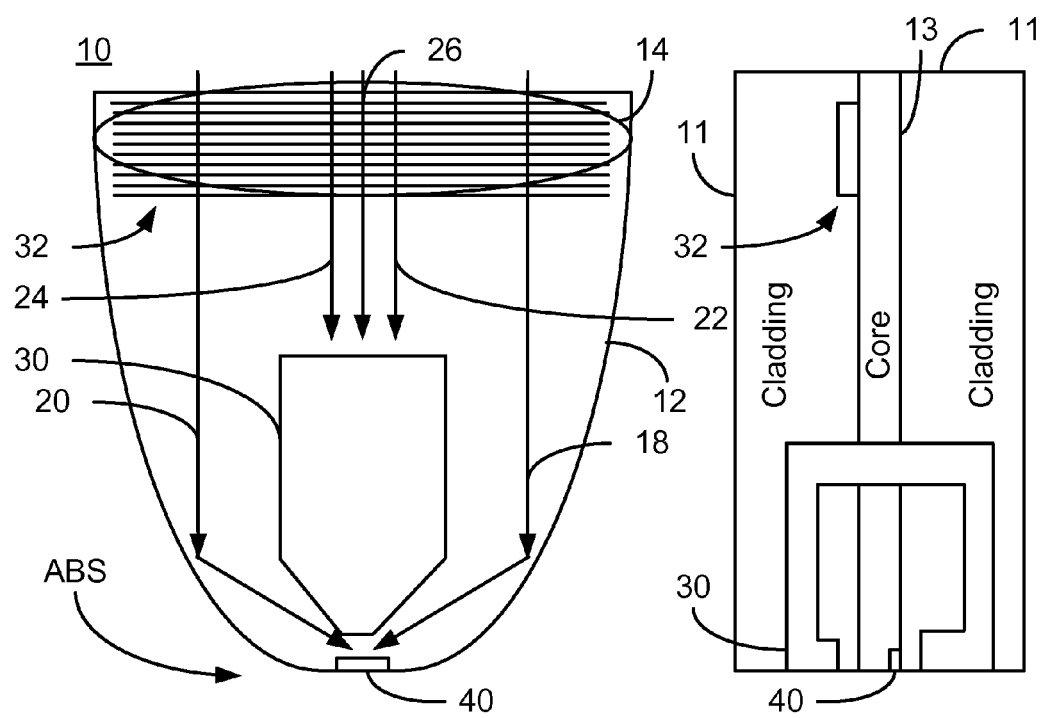
FIG. 1 is a diagram depicting a conventional EAMR transducer.
Figure 2:
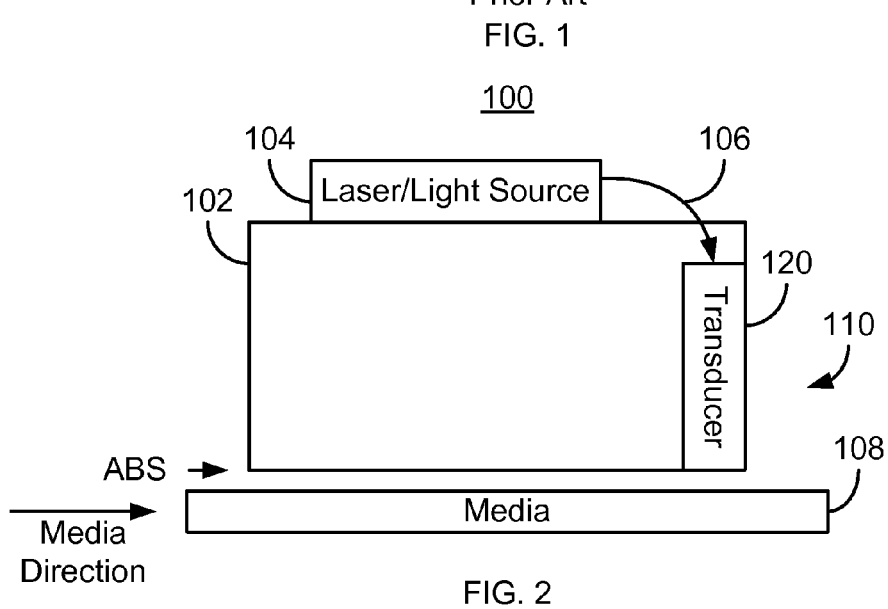
FIG. 2 is a diagram depicting an exemplary embodiment of an EAMR disk drive.
Figure 3:
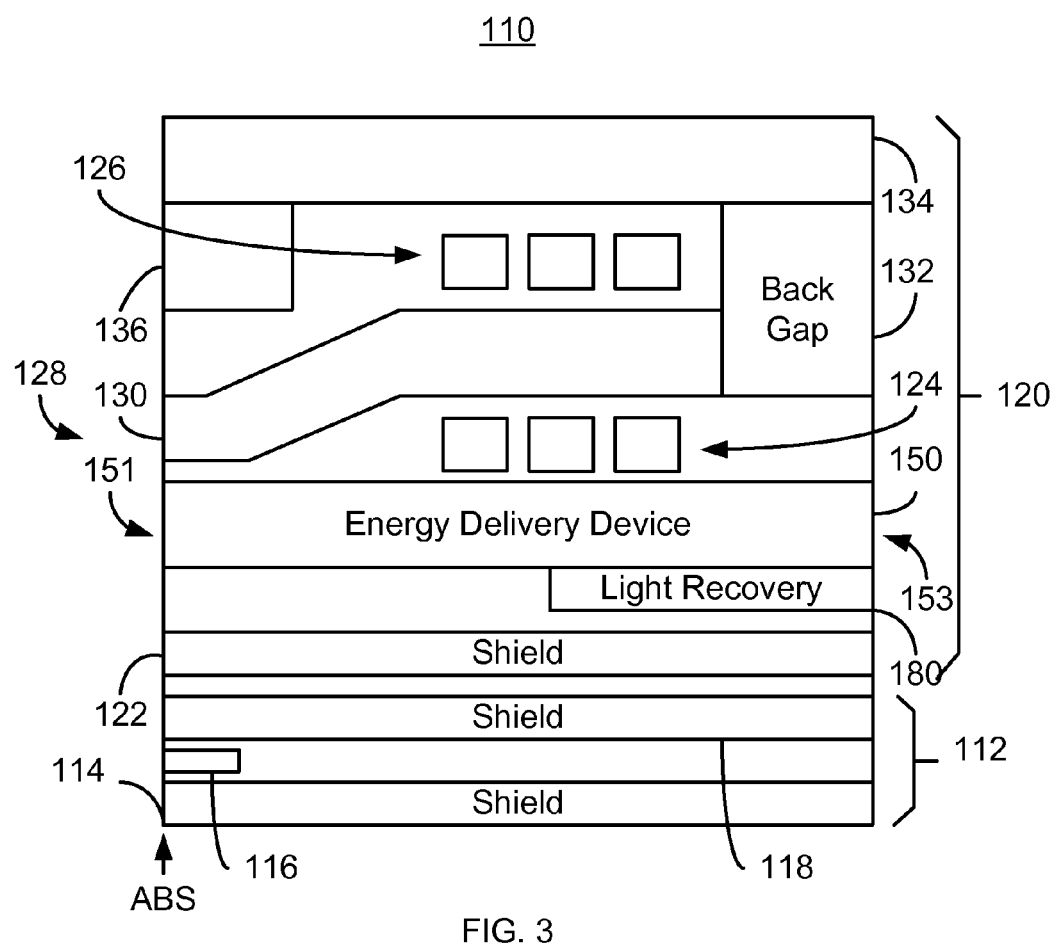
FIG. 3 is a diagram depicting an exemplary embodiment of an EAMR transducer using a light delivery mechanism.

FIG. 2 is a diagram depicting a portion of an EAMR disk drive 100 including an EAMR head 110. FIG. 3 is a diagram depicting an exemplary embodiment of the EAMR head 110. For clarity, FIGS. 2 and 3 are not to scale. Referring to FIGS. 2-3, for simplicity not all portions of the EAMR disk drive 100 is shown. In addition, although the disk drive 100 is depicted in the context of particular components other and/or different components may be used. Further, the arrangement of components may vary in different embodiments. The EAMR disk drive 100 includes a slider 102, a laser/light source 104, optional optics 106 for redirecting light from the laser 104, an EAMR head 110, and media 170. In some embodiments, the optics 106 include an optical coupler, mirror(s), a grating, and/or other components. In some embodiments, the laser 104 is a laser diode. In some such embodiments, the laser 104 may be a vertical surface emitting laser (VCSEL). Although shown as mounted on the slider 102, the laser 104 may be coupled with the slider 102 in another fashion. For example, the laser 104 might be mounted on a suspension (not shown in FIG. 2) to which the slider 102 is also attached. In other embodiments, the orientation of the emitting surface of the laser 104 with respect to the slider 102 may be different. The media 170 may include multiple layers, which are not shown in FIG. 2 for simplicity. For example, the media 170 may include a magnetic layer for storing data, a heat sink layer, and/or a soft underlayer.

The EAMR head 110 includes an optional read transducer 112 and an EAMR transducer 120. The read transducer 112 includes shields 114 and 118 as well as read sensor 116. In other embodiments, the read transducer 112 may be omitted. The EAMR transducer 120 shown includes a shield 122, coils 124 and 126, pole 128, energy delivery device 150, and light recovery device 180. Some portions of the EAMR transducer 120 may be omitted in FIG. 3. For example an optical coupler, grating or other device that might be used to couple light from the laser 104 to the energy delivery device 150 is not shown in FIG. 3. The pole 128 include pole tip 130, back gap region 132, and return pole 134 having pedestal 136. In other embodiments, the pole 128 may have different and/or additional components. Light recovery device 180 is optional and may include mirror(s) or other reflective surface(s). The light recovery device 180 might also include an additional laser. The light recovery device 180 may be used to recover light lost in the energy delivery device 150, input additional energy to the energy delivery device 150, and/or return the light to the energy delivery device 150. Although shown as separate, in some embodiments, the light recovery device 180 is part of the energy delivery device 150. Thus, efficiency of the EAMR head 110 may be improved.

The energy delivery device 150 optically is coupled with the laser 104. In some embodiments, the energy delivery device is directly coupled to the laser 104. In other embodiments, other mechanisms such as a grating or optical coupler may be used to optically couple the energy delivery device 150 with the laser 104. The energy delivery device 150 includes a bottom 151 proximate to the ABS and a top 153 distal from the ABS. The energy delivery device 150 also has sides (not shown in FIG. 3) in the cross track direction (perpendicular to the page in FIG. 3). The sides in the cross track direction converge and reflect light. Thus, light may be input to the energy delivery device 150 and plasmons developed at the output/aperture at the bottom 151. Thus, a soliton (not shown in FIG. 3) is formed at the bottom, aperture 151 of the energy delivery device 150. For example, the energy delivery device 150 could correspond to a numerical aperture greater than thirty. In some embodiments, the energy delivery device 150 has a corresponding numerical aperture of greater than fifty-six. In some such embodiments, the numerical aperture is not more than one hundred thirty. As a result, the energy delivery device 150 provides energy to the media 108.

In operation, the energy delivery device 150 couples the energy from the laser to the media 108, developing a soliton that heats a small region of the media 108. The coil(s) 124 and 126 energize the pole 128, which magnetically writes to the region of the media 108. Thus, data may be written to the media 108 using energy assisted magnetic recording. Because the energy delivery device 150 can deliver light through the above-described numerical aperture, the spot developed on the media 108 may be small. In some embodiments, the spot is on the order of twenty-five through thirty-five nanometers or less. Thus, the EAMR head 110 may be suitable for use in high density recording applications. The energy delivery device 150 also provides the small spot without requiring complex fabrication of components smaller than the spot size, such as the pin of an NFT. In some embodiments, the ability of the energy delivery device 150 is also insensitive to lapping. Thus, the energy delivery device 150 may improve manufacturing yield for the EAMR head 110.

Figure 4:
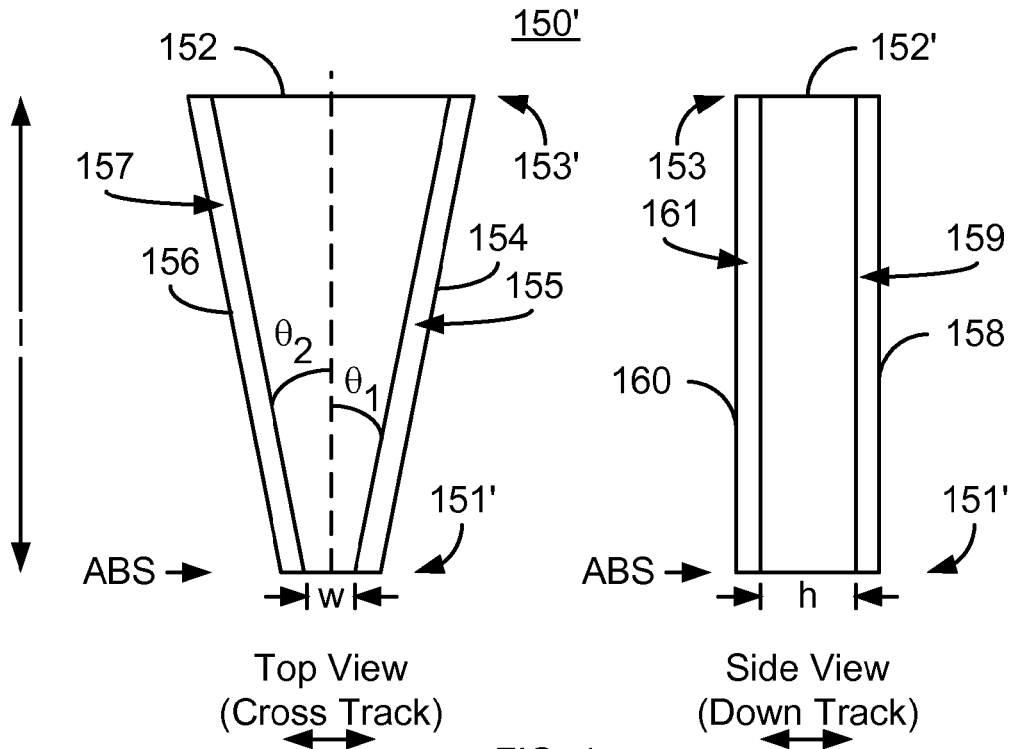
FIG. 4 is a diagram depicting an exemplary embodiment of an energy delivery device.

FIG. 4 is a diagram depicting top and side views of an exemplary embodiment of the energy delivery device 150'. FIG. 4 is not to scale. The energy delivery device 150' corresponds to the energy delivery device 150. Consequently, analogous components have similar labels. The energy delivery device 150' thus has a bottom 151' and a top 153' corresponding to the bottom 151 and top 153, respectively, shown in FIG. 3. The energy delivery device 150' may be used in an EAMR head such as the EAMR head 110. In principal, the energy delivery device 150' may be configured for use with light of a particular wavelength. However, the light from the laser may actually have wavelengths in a range around the particular wavelength.

The energy delivery device 150' includes a core 152. In some embodiments, the energy delivery device may include optional reflective cladding 154 and 156 and optional cladding 158 and 160. The core 152 may include optically transparent materials including but not limited to $Ta_2O_5$. The core 152 has sides 155 and 157 and faces 159 and 161. The sides 155 and 157 are in the cross track direction. In the embodiment shown, the sides are planar. However, in other embodiments, the sides 155 and 157 may be curved. The sides 155 and 157 reflect the energy transmitted by the energy delivery device 150'. This reflectivity of the sides 155 and 157 may be due to highly reflective cladding 154 and 156. In some embodiments, the highly reflective cladding 154 and 156 are formed from the same material and/or at the same processing step. The highly reflective cladding 154 and/or 156 may include one or more of Au, Ag, and Pt. In some embodiments, for example, the reflective cladding 154 and/or 156 may be Au. However, in other embodiments, different materials and/or different processing steps may be used.

The faces 159 and 161 are in the down track direction. In the embodiment shown, the faces 159 and 161 are substantially parallel. However in other embodiments, the faces 159 and 161 may converge. In the embodiment shown, the faces 159 and 161 share an interface with cladding 158 and 160, respectively. In some embodiments, the cladding 158 and 160 may have an index of refraction that is lower than the index of refraction of the core 152. For example, if the core 152 is composed of $Ta_2O_5$, then the cladding 158 and 160 may include materials such as aluminum oxide, silicon oxide, or other silicates which have lower indices of refraction than $Ta_2O_5$. In other embodiments, the cladding 158 and 160 may be highly reflective. For example, the cladding 158 and 160 may include Au, Ag, and/or Pt.

The energy delivery device 150' has apex angles $\theta_1$ and $\theta_2$ corresponding to sides 155 and 157, respectively. The apex angles $\theta_1$ and $\theta_2$ are selected such that the sides 155 and 157 converge toward the ABS. Thus, the energy delivery device 150' transmits the energy toward the ABS. The apex angle are configured such that the energy input to the energy delivery device 150' reflects off of the sides 155 and 157 and forms a soliton substantially at the bottom 151' of the energy delivery device 150'. In some embodiments, therefore, the first apex angle, $\theta_1$ is at least three and not more than twenty-five degrees. In some embodiments, the second apex angle, $\theta_2$ is at least three and not more than twenty-five degrees. The desired apex angles may depend upon the material used for the highly reflective cladding 154 and 156 and the plasmon modes supported by the highly reflective cladding 154 and 156. In some embodiments, the second apex angle is equal to the first apex angle. In such embodiments, the sides 155 and 157 are symmetric. However, in other embodiments, the first and second apex angles may differ. Further, as can be seen in FIG. 4, the axis of the energy delivery device 150' is normal to the ABS. However, in other embodiments, the axis of the energy delivery device 150' may not be perpendicular to the ABS. The energy delivery device 150' has a height I. The height may vary depending upon the distance between the position at which light energy is coupled into the energy delivery device 150' and the ABS as well as the apex angles. The height is sufficiently short that the energy input to the energy delivery device 150' is not unduly attenuated. In general, the height may be larger for smaller apex angles. In some embodiments, the energy delivery device 150' is up to ten microns in height with a top width at the top 153' of up to one micron. The energy delivery device 150' converges down to a width, w, at the ABS. for example, in some embodiments, the width at the bottom 151', or aperture, is one hundred nanometers or less. In some embodiments, the width is not more than fifty nanometers. In some embodiments, the aperture has a height, h, of one hundred nanometers. As a result, the energy delivery device may have a numerical aperture that is greater than thirty. In some embodiments, the numerical aperture is greater than 56. In addition, in some embodiment, the numerical aperture is not greater than one hundred and thirty.

Figure 5:
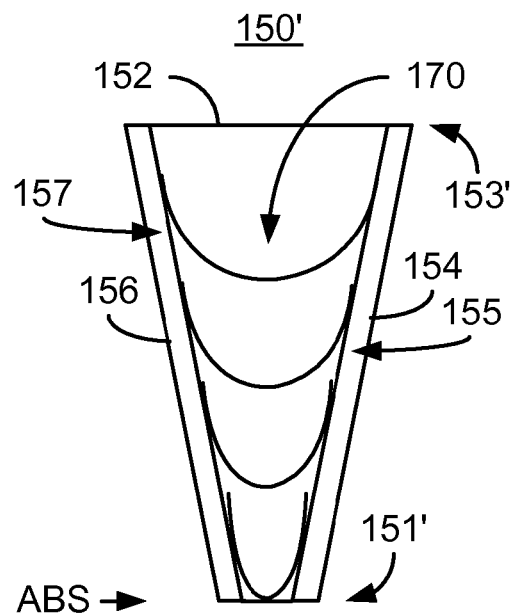
FIG. 5 is a diagram depicting the propagation of energy through an exemplary embodiment of an energy delivery device.

To further describe the operation of the energy delivery device 150', refer to FIG. 5, which depicts an exemplary embodiment of the energy delivery device 150' as it functions. Referring to FIGS. 4-5, light is input to the energy delivery device 150' at its top 153'. The input light reflects off of the sides 155 and 157/highly reflective cladding 154 and 156. The reflected light forms an interference pattern 170, which converges as the sides 155 and 157 converge. As the sides 155 and 157 converge, the energy is in the form of plasmons that form the interference pattern near the bottom 151'. At the bottom 151', which is the aperture for the energy delivery device 150', a soliton is formed, and a spot provided on the media. The size of the spot may be controlled by the apex angle, material(s) used for the core 152, material(s) used for the highly reflective cladding 154 and 156, and cladding 158 and 160. Because of the interference pattern and the formation of the soliton, the size of the spot may be controlled without requiring the construction of a component smaller than the desired spot.

The energy delivery device 150' provides the small spot without requiring complex fabrication of components smaller than the spot size, such as the pin of an NFT. Thus, an EAMR head 110 suitable for higher density recording may be provided. In some embodiments, the ability of the energy delivery device 150 is also insensitive to lapping. This is because the apex angle of the energy delivery device 150/150' may be small. Thus, an error in lapping the bottom 151' of the energy delivery device 150' does not affect the width, w. Further, the faces 159 and 161 may be parallel and perpendicular to the ABS. Thus, fabrication of the energy delivery device 150' in the down track direction may be made with discrete changes in materials used in various processing steps. Consequently, processing of the energy delivery device 150' is further simplified. Thus, the energy delivery device 150' may also improve manufacturing yield for the EAMR head 110. The energy delivery device 150' has a large surface area, which may improve cooling of the energy delivery device 150', for example by the use of cladding 158 and 160 that is conductive. Performance of the EAMR head 110 may thus be improved. The energy delivery device 150' may also be directly coupled to the laser 104. Thus, design of the EAMR head 110 may be simplified.

Figure 6:
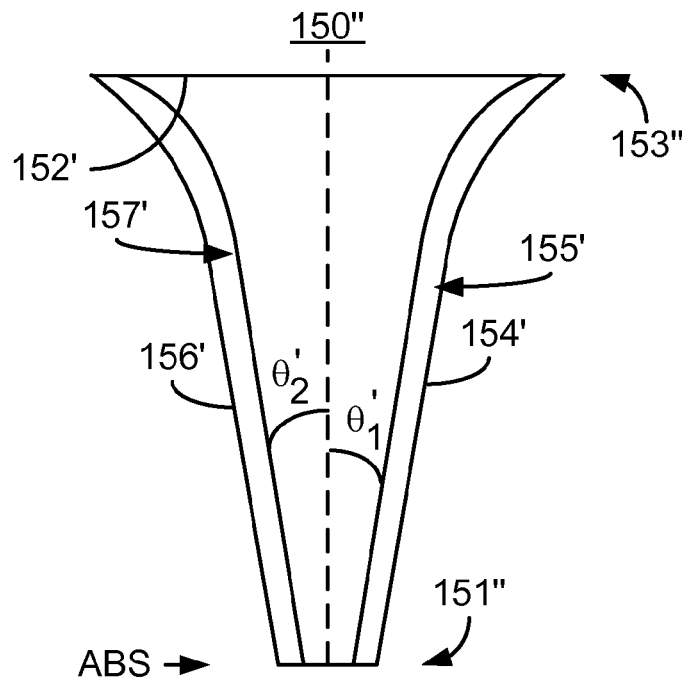
FIG. 6 is a diagram depicting another exemplary embodiment of an energy delivery device.

FIG. 6 depicts another embodiment of an energy delivery device 150". For clarity, FIG. 6 is not to scale. The energy delivery device 150" corresponds to the energy delivery devices 150 and 150'. Consequently, analogous components have similar labels. The energy delivery device 150" thus has a bottom 151", top 153", core 152' and highly reflective cladding 154' and 156' corresponding to the bottom 151, top 153, core 152, and highly reflective cladding, respectively, shown in FIG. 4. The energy delivery device 150" may be used in an EAMR head such as the EAMR head 110. In principal, the energy delivery device 150" may be configured for use with light of a particular wavelength. However, the light from the laser may actually have wavelengths in a range around the particular wavelength. The energy delivery device 150" functions in an analogous manner to the energy delivery device 150/150'. However, the sides 155' and 157' are not straight. Instead, the sides 155' and 157' curve outward near the top 153". In other embodiments, the sides 155' and 157' may be curved a different amount. The curvature of the sides 155' and 157' improve the coupling of light into the energy delivery device 150". The energy delivery device 150" may have improved efficiency and reduced propagation losses.

Figure 7:
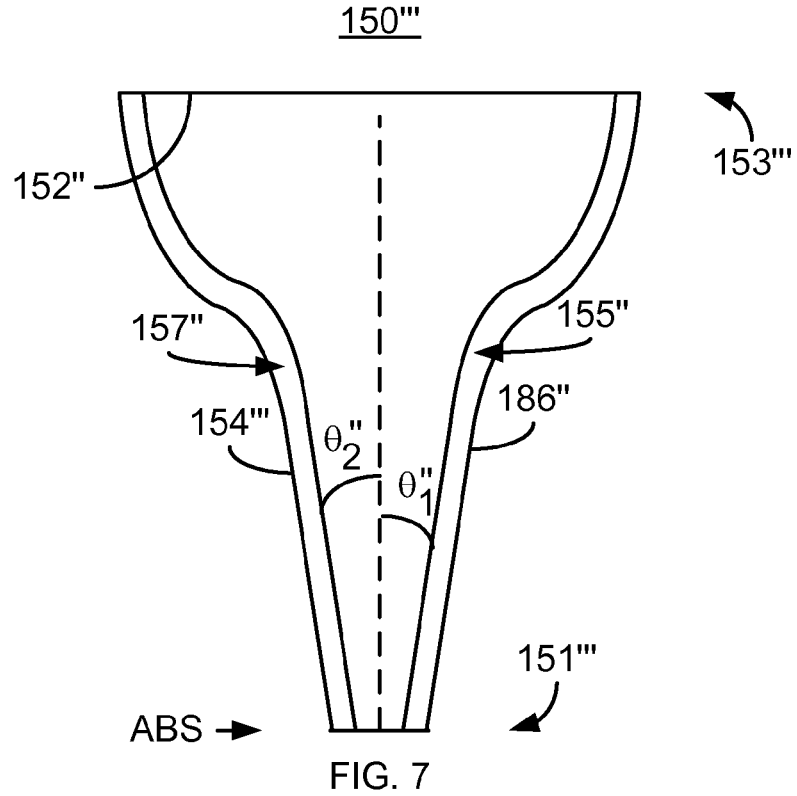
FIG. 7 is a diagram depicting another exemplary embodiment of an energy delivery device.

Similarly, FIG. 7 depicts another embodiment of an energy delivery device 150'''. For clarity, FIG. 7 is not to scale. The energy delivery device 150''' corresponds to the energy delivery devices 150, 150', and 150". Consequently, analogous components have similar labels. The energy delivery device 150''' thus has a bottom 151", top 153''', core 152" and highly reflective cladding 154" and 156" corresponding to the bottom 151, top 153, core 152', and highly reflective cladding, respectively, shown in FIG. 4. The energy delivery device 150''' may be used in an EAMR head such as the EAMR head 110. In principal, the energy delivery device 150''' may be configured for use with light of a particular wavelength. However, the light from the laser may actually have wavelengths in a range around the particular wavelength. The energy delivery device 150''' functions in an analogous manner to the energy delivery device 150/150'/150". However, the sides 155" and 157" are not straight. Instead, the sides 155" and 157" have an "s" curve near the top 153'''. In other embodiments, the sides 155" and 157" may be curved a different amount. The light delivery devices 150" and 150''' function in an analogous manner to the light delivery devices 150 and 150'. Thus, the benefits of the light delivery devices 150 and 150' may be achieved. The curvature of the sides 155" and 157" improve the coupling of light into the energy delivery device 150'''. In addition, the energy delivery device 150" and 150''' may have improved efficiency and reduced propagation losses.

Figure 8:
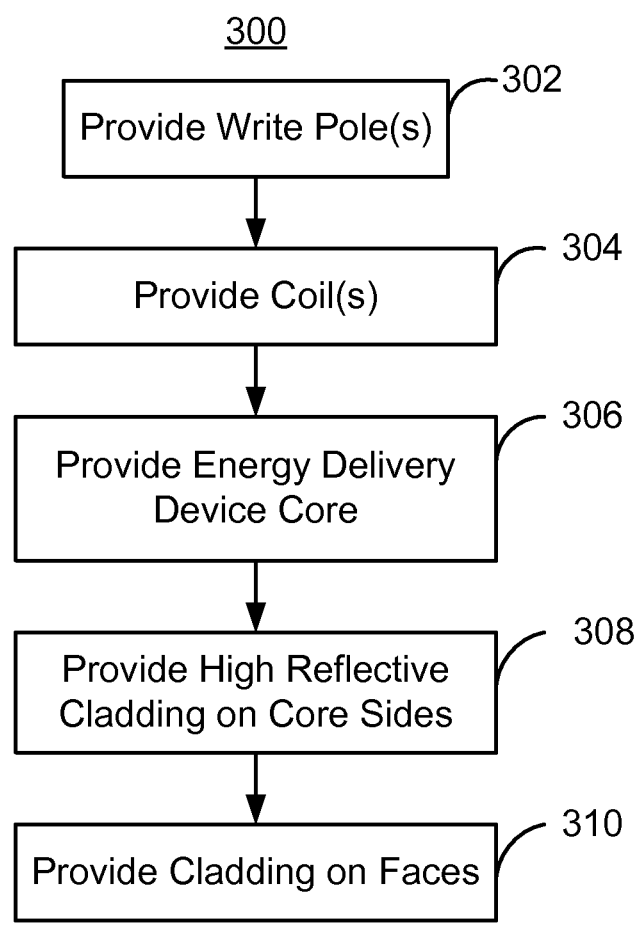
FIG. 8 is a flow chart depicting an exemplary embodiment of a method for fabricating an EAMR transducer including an energy delivery device.

FIG. 8 is a flow chart depicting another exemplary embodiment of a method 300 for fabricating an EAMR head including an energy delivery device. For simplicity, some steps may be omitted, combined, and/or performed in another sequence. The method 300 is described in the context of the EAMR disk drive 100, EAMR head 110, and energy delivery device 150'. However, the method 300 may be used to fabricate other EAMR heads. In addition, the method 300 is described in the context of fabricating a single disk drive 100. However, multiple transducers may be fabricated substantially in parallel. Further, although described as separate steps, portions of the method 300 may be interleaved.

The write pole 130 and its constituents are provided, via step 302. The coil(s) 124 and 126 for energizing the pole 130 are also provided in step 304. The core 152 of the energy delivery device is provided, via step 306. The highly reflective cladding 154 and 156 is provided, via step 308. The cladding 148 and 160 may optionally be provided in step 310. Thus, the energy delivery devices 150, 150', 150", and/or 150''' may be provided in the EAMR head 110.

Using the method 300, the EAMR head 110 including the energy delivery device 150, 150', 150", and/or 150''' may be obtained. Consequently, the benefits of such devices may be achieved.

We claim:

1. An energy assisted magnetic recording (EAMR) transducer coupled with a laser for providing energy and having an air-bearing surface (ABS) configured to reside in proximity to a media during use, the EAMR transducer comprising:
   a write pole configured to write to a region of the media;
   at least one coil for energizing the write pole;

an energy delivery device optically coupled with the laser, the energy delivery device including a top distal from the ABS, a bottom proximate to the ABS, a first side having a second side opposite to the first side, the first side having a first apex angle from a normal to the ABS and being reflective, the second side having a second apex angle from the normal to the ABS and being reflective, the first apex angle being at least three and not more than twenty-five degrees, the second apex angle being at least three and not more than twenty-five degrees, the first side and the second side converging such that the top is wider than the bottom and such that the energy reflecting between the first side and the second side forms a soliton substantially at the bottom of the energy delivery device.

2. The EAMR transducer of claim 1 wherein the first side and the second side are symmetric.

3. The EAMR transducer of claim 2 wherein the first apex angle is equal to the second apex angle.

4. The EAMR transducer of claim 1 wherein the first side and the second side include a high reflectivity cladding.

5. The EAMR transducer of claim 4 wherein the high reflectivity cladding includes at least one of Au, Ag, and Pt.

6. The EAMR transducer of claim 1 wherein the energy delivery device further includes a $Ta_2O_5$ core.

7. The EAMR transducer of claim 1 wherein the first side and the second side correspond to a cross-track direction on the media and wherein the energy delivery device further includes a first face and a second face in a down track direction.

8. The EAMR transducer of claim 7 wherein the first face is substantially parallel to the second face.

9. The EAMR transducer of claim 8 wherein the first face and the second face include a cladding.

10. The EAMR transducer of claim 9 wherein the energy delivery device includes a core having a first index of refraction and the cladding has a second index of refraction less than the first index of refraction.

11. The EAMR transducer of claim 1 wherein the energy delivery device has a numerical aperture greater than 30.

12. The EAMR transducer of claim 11 wherein the energy delivery device has a numerical aperture greater than 56.

13. The EAMR transducer of claim 11 wherein the energy delivery device has a numerical aperture not more than 130.

14. The EAMR transducer of claim 1 wherein the energy delivery device is directly coupled to the laser.

15. The EAMR transducer of claim 1 further comprising:
a grating, the energy delivery device being coupled to the laser through the grating.

16. The EAMR transducer of claim 1 wherein the first side and the second side are curves.

17. The EAMR transducer of claim 1 wherein the first side and the second side are planar.

18. The EAMR transducer of claim 1 further comprising:
a light recovery device distal from the bottom of the energy delivery device.

19. The EAMR transducer of claim 1 wherein the energy delivery device further includes:
a light recovery device distal from the bottom of the energy delivery device.

20. An energy assisted magnetic recording (EAMR) transducer coupled with a laser for providing energy and having an air-bearing surface (ABS) configured to reside in proximity to a media during use, the EAMR transducer comprising:
a write pole configured to write to a region of the media;
at least one coil for energizing the write pole;
an energy delivery device optically coupled with the laser, the energy delivery device including a top distal from the ABS, a bottom proximal to the ABS, a first side and a second side opposite to the first side, the first side having a first apex angle from a normal to the ABS and being reflective, the second side having a second apex angle from the normal to the ABS and being reflective, the first side and the second side converging such that the top is wider than the bottom and such that the energy reflecting between the first side and the second side forms a soliton substantially at the bottom of the energy delivery device, the energy delivery device having a numerical aperture greater than thirty and a length of not more than ten microns in a direction perpendicular to the ABS.

21. An energy assisted magnetic recording (EAMR) transducer coupled with a laser for providing energy and having an air-bearing surface (ABS) configured to reside in proximity to a media during use, the EAMR transducer comprising:
a write pole configured to write to a region of the media;
at least one coil for energizing the write pole;
an energy delivery device optically coupled with the laser, the energy delivery device including a $Ta_2O_5$ core, a top distal from the ABS, a bottom proximal to the ABS, a first side, a second side opposite to the first side, a first face and a second face opposite and parallel to the first face, the first side having a first apex angle from a normal to the ABS and having a first reflective Au cladding, the second side having a second apex angle from the normal to the ABS and having a second reflective Au cladding, the first apex angle being at least three and not more than twenty-five degrees, the second apex angle being equal to the first apex angle, the first side and the second side converging such that the top is wider than the bottom and such that the energy reflecting between the first side and the second side forms a soliton, wherein the first side and the second side correspond to a cross-track direction on the media and wherein the first face and the second face correspond to a down track direction on the media, the first face and the second face including a cladding having an index of refraction less than a $Ta_2O_5$ index of refraction.

22. An energy assisted magnetic recording (EAMR) disk drive comprising:
a media for storing data;
a slider having an air-bearing surface (ABS) configured to reside in proximity to the media during use;
a laser coupled with the slider for providing energy;
an EAMR transducer coupled with the slider and including a write pole, at least one coil, and an energy delivery device optically coupled with the laser, the write pole configured to write to a region of the media, the at least one coil for energizing the write pole, the energy delivery device optically coupled with the laser, the energy delivery device including a top distal from the ABS, a bottom proximal to the ABS, a first side and a second side opposite to the first side, the first side having a first apex angle from a normal to the ABS and being reflective, the second side having a second apex angle from the normal to the ABS and being reflective, the first apex angle being at least three and not more than twenty-five degrees, the second apex angle being at least three and not more than twenty-five degrees, the first side and the second side converging such that the top is wider than the bottom and such that the energy reflecting between the first side and the second side forms a soliton substantially at the bottom of the energy delivery device.

23. The EAMR disk drive of claim 22 wherein the energy delivery device is directly coupled to the laser.

24. The EAMR disk drive of claim 22 wherein the EAMR transducer further includes a grating and wherein the energy delivery device is coupled to the laser through the grating.

25. An energy assisted magnetic recording (EAMR) disk drive comprising:
- a media for storing data;
- a slider having an air-bearing surface (ABS) configured to reside in proximity to the media during use;
- a laser coupled with the slider for providing energy;
- an EAMR transducer coupled with the slider and including a write pole, at least one coil, and an energy delivery device optically coupled with the laser, the write pole configured to write to a region of the media, the at least one coil for energizing the write pole, the energy delivery device optically coupled with the laser, the energy delivery device including a top distal from the ABS, a bottom proximal to the ABS, a first side and a second side opposite to the first side, the first side having a first apex angle from a normal to the ABS and being reflective, the second side having a second apex angle from the normal to the ABS and being reflective, the first side and the second side converging such that the top is wider than the bottom and such that the energy reflecting between the first side and the second side forms a soliton substantially at the bottom of the energy delivery device, the energy delivery device having a numerical aperture greater than thirty and a length of not more than ten microns in a direction perpendicular to the ABS.

26. The EAMR transducer of claim 1 wherein the energy delivery device has a length of not more than ten microns.

27. The EAMR transducer of claim 1 wherein the first side and the second side converge along substantially an entire length of the energy delivery device in a direction perpendicular to the ABS.

28. The EAMR transducer of claim 20 wherein the first side and the second side converge along substantially an entire length of the energy delivery device in a direction perpendicular to the ABS.

29. The EAMR transducer of claim 21 wherein the first side and the second side converge along substantially an entire length of the energy delivery device in a direction perpendicular to the ABS.

30. The EAMR disk drive of claim 22 wherein the first side and the second side converge along substantially an entire length of the energy delivery device in a direction perpendicular to the ABS.

31. The EAMR disk drive of claim 25 wherein the first side and the second side converge along substantially an entire length of the energy delivery device in a direction perpendicular to the ABS.

* * * * *